United States Patent [19]

McNeal et al.

[11] Patent Number: 4,495,689
[45] Date of Patent: Jan. 29, 1985

[54] TOOL FOR PLACEMENT OF O-RINGS AND METHOD

[76] Inventors: Lawrence N. McNeal, 2461 Brahms Blvd., Dayton, Ohio 45449; Robin A. McNeal, 1301 Levee Dr., Houma, La. 70360

[21] Appl. No.: 525,851

[22] Filed: Aug. 24, 1983

[51] Int. Cl.³ ............................ B23Q 3/00; B25B 1/20
[52] U.S. Cl. ........................................ 29/468; 29/269; 29/271; 29/283; 29/526 R; 269/43; 269/238; 277/1; 277/11
[58] Field of Search ................ 29/468, 526 R, 157 R, 29/271, 269, 283; 277/1, 9.5, 11, 10; 269/43, 238

[56] References Cited

U.S. PATENT DOCUMENTS

| | | | |
|---|---|---|---|
| 442,733 | 12/1890 | Shampel | 269/238 X |
| 1,674,330 | 6/1928 | Hyler | 269/238 X |
| 2,127,578 | 8/1938 | Wyman | 277/11 |
| 2,249,783 | 7/1941 | Reggio | 29/238 UX |
| 2,319,113 | 5/1943 | Christman | 29/468 UX |
| 2,399,870 | 5/1946 | Huntington et al. | 269/238 X |
| 3,620,554 | 11/1971 | Ward et al. | 29/526 R X |
| 3,909,011 | 9/1975 | Sheesley | 277/11 |
| 4,434,978 | 3/1984 | Klaster | 269/238 X |
| 4,436,310 | 3/1984 | Sawabe et al. | 277/11 |

Primary Examiner—Charlie T. Moon
Attorney, Agent, or Firm—Biebel, French & Nauman

[57] ABSTRACT

A tool is provided for positioning an "O" ring in a seating groove cut into the face of a section of flanged pipe. The tool includes a set of two adjustable tongs to grasp the "O" ring. The tongs are held in a fixed position by a pair of parallel facing plates. Bolts running through the parallel facing plates also run through a verticle plate of a support member which secures the tool to the flange.

5 Claims, 3 Drawing Figures

TOOL FOR PLACEMENT OF O-RINGS AND METHOD

BACKGROUND OF THE INVENTION

Large diameter pipe of the type employed to transport gases and liquids under pressure typically are made with flanges on each end with "O" ring seats, i.e., hemispherical annular seating grooves, cut into the face of each flange. To seal two pipe sections together to provide a tight leakproof seal, an "O" ring is placed in the seats cut into the complementary faces of the flanges of the two pipe sections to be joined. When the flanges are sealed by bolting the flanges together, the "O" ring is compressed to provide a tight, leakproof seal.

This method of joining flanged pipe sections does not present unusual difficulties where the pipe sections are to be assembled above ground and in good light. Serious difficulties are encountered, however, when the above-described method must be employed to join pipe sections together under water as in laying pipe to deliver oil or gas from off-shore wells to on-shore gathering facilities. As can be readily visualized, visibility in such work locations is poor. Moreover, surface wave action frequently causes the support vessel to surge. The movement of the support ship tends to move one or both of the flanges, which in turn may cause slippage of the "O" ring. The incidence of hand injury suffered by divers assembling pipe lines is high by reason of a tendency of divers to hand hold an "O" ring in the desired position while another pipe section is being moved into proper position to seal the flanged sections of pipe together.

Accordingly, there is a serious need in the art for improved tools and methods for seating an "O" ring in a seat defined by seating grooves cut into complementary sections of flanged pipe.

SUMMARY OF THE INVENTION

The present invention provides a tool for positioning an "O" ring in the seat cut into the faces of two complementary sections of flanged pipe. The tool holds the "O" ring in proper position while the two sections of flanged pipe are being loosely tightened and then can be withdrawn while leaving the "O" ring circumscribed and trapped in the seat provided in the loosely joined pipe sections. The tool includes a set of thin, substantially flat tongs whose grasping jaws define a circle and are capable of holding the "O" ring. The thickness of the tongs' jaws is less than the diameter of the annulus of the "O" ring to be grasped by the jaws. The tongs are held in a proper plane by a pair of parallel facing plates. Bolts passing through the facing plates are secured to a verticle plate of a support member which is attached to one of the flanges. The two flanges are brought ino aligned position and loosely bolted together. This action "traps" the "O" ring in its seat. The tongs then are spread apart and the tool is removed. Finally, the flanges are sealed by torquing the assembly bolts to their designated level.

DETAILED DESCRIPTION OF THE INVENTION

Figure 2:
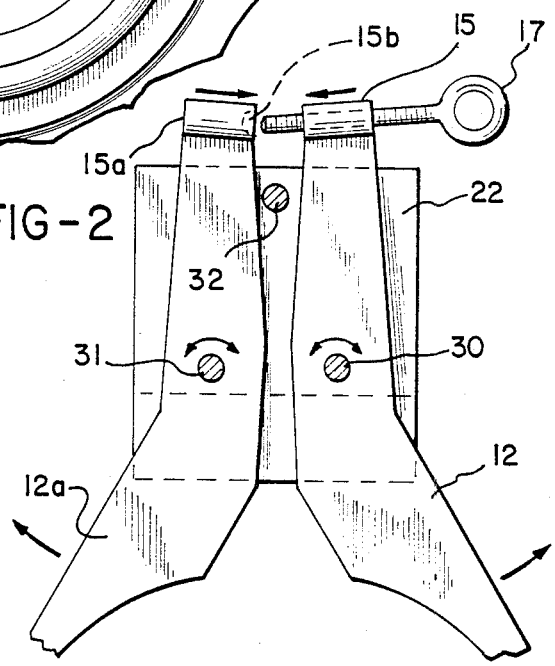
FIG. 2 is a front plan view of the upper portion of the tool with its top facing plate removed.
Figure 3:
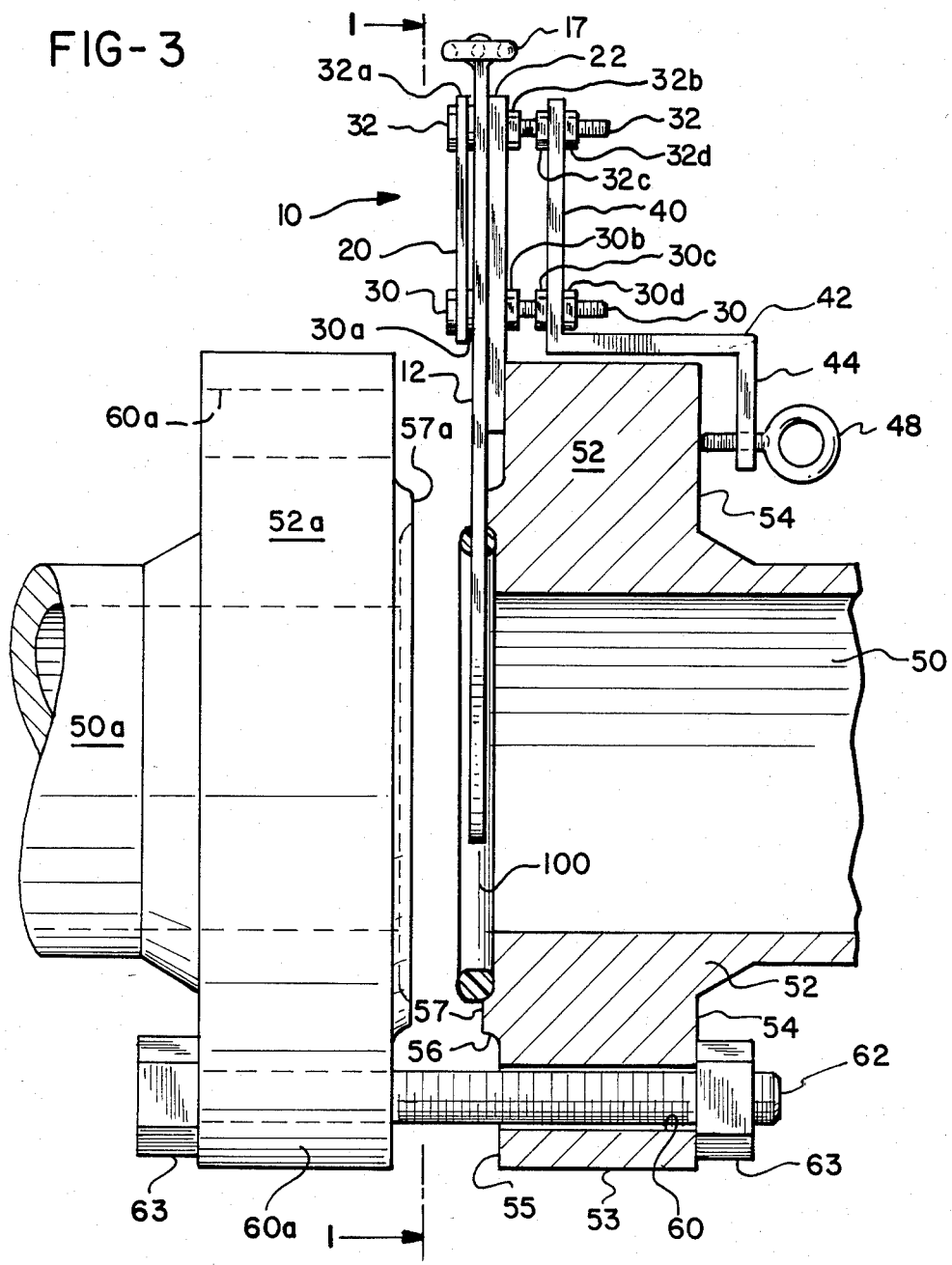
FIG. 3 is a side elevation view, partially in section, illustrating the manner in which the tool is used to position the "O" ring in the seat defined by seating grooves cut into two complementary sections of flanged pipe.

The tool 10 includes a set of complementary tongs 12 and 12a. The respective lower halves of tongs 12 and 12a have facing interior arcuate surfaces which function to grasp an "O" ring. As best seen in FIG. 3, the tongs 12 and 12a are quite thin and substantially thinner than the cross sectional diameter of the annulus of the "O" rings 100 grasped thereby. As seen in FIG. 2, each of tongs 12 and 12a includes holes through which bolts 30 and 31 are passed. The bolts 30 and 31 function as pivot points when the grasping jaws of 12 and 12a are moved either toward or away from each other, the direction of motion of the various sections of 12 and 12a being indicated by the arrows shown in FIGS. 1 and 2. The tong 12 includes on its upper end threaded sleeve 15. Tong 12a includes on its upper end a sleeve 15a having a pocket 15b machined in one end. A screw 17 extends through sleeve 15 and, in the position shown in FIG. 1, extends into a recessed pocket 15b included in sleeve 15a. Rotation of the screw 17 to urge the end of the screw 17 into the pocket 15b brings the grasping jaws of the lower sections of tongs 12 and 12a together. Turning the screw 17 to withdraw the screw 17 out of pocket 15b allows the lower half of tongs 12 and 12a to be spread apart as indicated in FIG. 2.

Tongs 12 and 12a are held in operable position by means of parallel facing plates 20 and 22. For convenience of description, plate 20 is sometimes hereafter designated as the "assembly plate" with plate 22 being referred to as the "space plate". The plates 20 and 22 are held together by bolts 30, 31, and 32 which pass through aligned holes provided in the plates. Bolts 30 and 31 also pass through aligned holes provided in tongs 12 and 12a. A thin, flat washer 30a is provided between assembly plate 20 and tong 12 to prevent binding of the tong. Although not shown in the drawings, a like washer 31a is provided between the face of assembly plate 20 and tong 12a. A somewhat thicker washer or spacer 32a is provided between the interior faces of assembly plate 20 and spacer plate 22 so that the plates 20 and 22 are held in fixed, parallel relationship over their entire area. A series of lock nuts 30b, 31b (not shown), and 32b fix the spacer plate 22 in spaced, parallel relationship with assembly plate 20.

The parallel facing plates 20 and 22 and the tongs 12 and 12a are held and supported in a vertical plane by a support element, which in the embodiment shown is a three-faced plate having the shape of a "Z." The "Z" plate includes a vertical plate 40, a horizontal plate 42, and a depending lip plate 44. The bolts 30, 31, and 32 pass through aligned holes provided in vertical plate 40. Lock nuts 30c and 30d mounted on bolt 30 together with the lock nuts 32c and 32d provided on bolt 32 and corresponding unseen lock nuts provided on bolt 31 keep vertical plate 40 in a fixed, spaced, parallel relationship with facing plates 20 and 22. A series of holes 46 are provided in lip plate 44 to receive two or more set bolts 48. The bolts 48 can be turned so that they engage the rear face 54 of flange 52 as best seen in FIG. 3. The contact provided between plate 22 and the front face 55 of flange 52 and the contact between the ends of bolts 48 and the rear face 54 of flange 52 holds the tool 10 firmly with the tongs 12 and 12a being held in a vertical plane aligned with the exterior face 57 of flange 52.

As shown in FIG. 3, a small gap of about one-quarter inch is provided between the bottom face of plate 42 and the face 53 of flange 52. This gap is provided by reason of the fact that subsea growth such as barnacles form on underwater pipe and are difficult to remove completely. The provision of such a gap minimizes problems of properly aligning the "O" ring with the "O" ring seating grooves.

Figure 1:
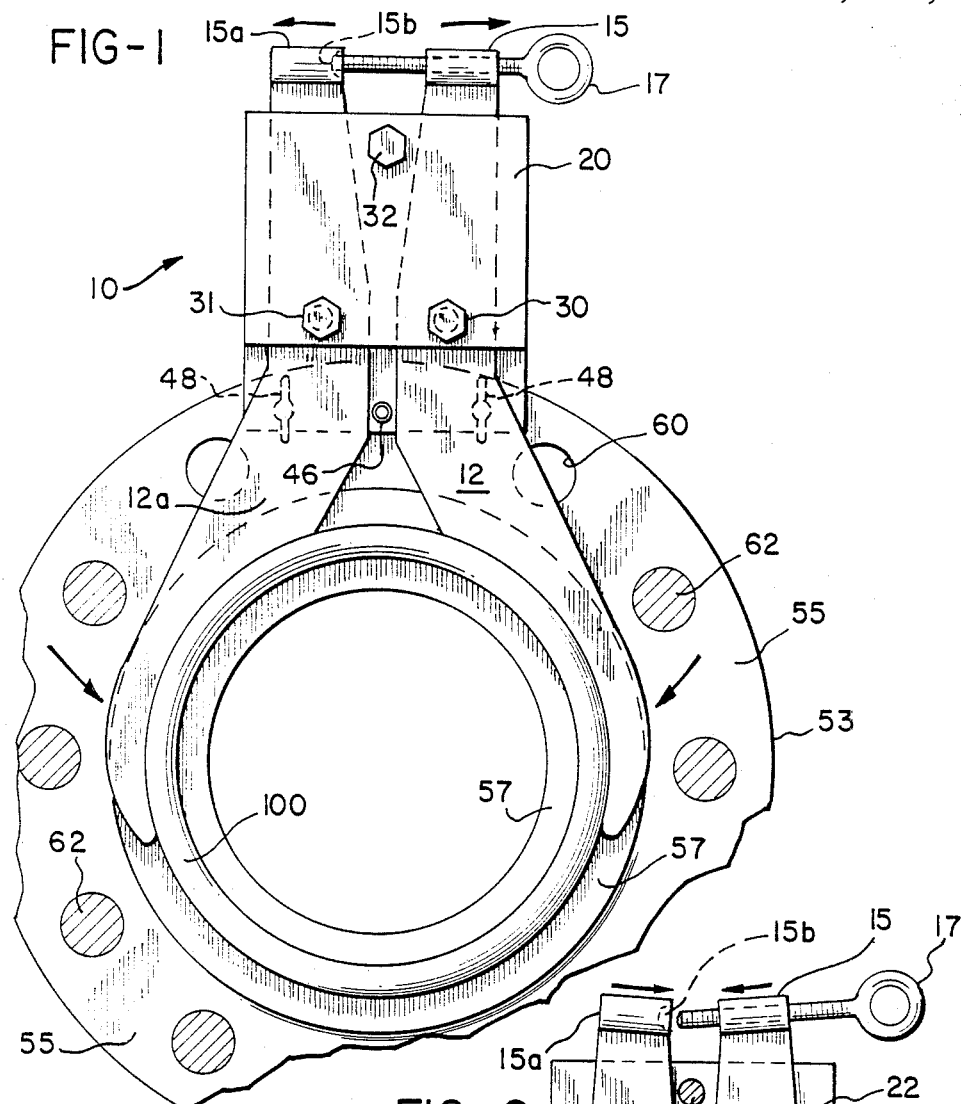
FIG. 1 is a front plan view, taken through 1—1 of FIG. 3, of the tool of the invention mounted on the flange of a pipe section and holding an "O" ring in the seat cut into the face of said flange.

As illustrated in FIGS. 1 and 3, the tool 10 is mounted on the flange 52 of a section of pipe 50. Also shown in FIG. 3 is a complementary pipe section 50a to be joined to pipe section 50 with like parts of the pipe sections bearing like numbers. Flange 52 includes an exterior face 53, a rear face 54, and a front face 55. The flange also includes an elevated annular section 56 having a face 57. Face 57 has a hemispherical annular groove machined therein which forms a half of the seat for "O" ring 100. The "O" ring seat is not seen as such in the drawings, but lies immediately below "O" ring 100 in FIG. 1.

A typical manner for using tool 10 to seat an "O" ring in the seat provided by two complementary sections of flanged pipe is to first loosely assemble the two sections of pipe together by passing bolts 62 through bolt holes 60 and 60a of the two flanges. An "O" ring 100 then is firmly grasped by the jaws of tongs 12 and 12a as previously described. The set screws 48 previously will have been backed out of contact with a rear flange face in an earlier operation. The assembled tool then is inserted into the gap between the faces of the two flanges. In FIG. 3, the tool 10 is shown mounted on the top dead center position of flange 52, but this is not a requirement. An important design characteristic of the invention is that the tool can be mounted at any location around the flange's perimeter. This flexibility is of major significance in that it permits the divers to work in the most comfortable and safest position, usually where the widest gap is provided between the flanges. The rearward face of spacer plate 22 will be urged against the face 55 of flange 52. By slight movement of the tool 10, the worker can determine (by feel) when "O" ring 100 has been seated in the "O" ring seat provided in the face 57 of flange 52. At this time, the set screws 48 are tightened to rigidly fix the position of the tool 10.

The complementary pipe section 50a then is brought into virtually touching contact with pipe section 50 by further turning of nuts 63 on bolts 62. When the face 57a of pipe section 50a virtually touches the face of tongs 12 and 12a, "O" ring 100 is completely circumscribed by and "captured" by the "O" ring seating grooves provided in the faces 57 and 57a. The tongs 12 and 12a are spread apart as previously described, and set screws 48 are backed out of contact with the face 54 of flange 52. The tool is thus loosened and is removed from flange 52. Any remaining bolts 62 are then inserted into the openings in the flanges 52 and 52a and all of the nuts 63 are torqued to an appropriate degree to provide a leakproof seal between the pipe sections 50 and 50a.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool for positioning an "O" ring in the "O" ring seating groove cut into the face of a section of flanged pipe or the like comprising in combination:
    (a) a set of thin, substantially flat tongs whose grasping jaws define the circumference of a circle, the thickness of said grasping jaws being less than the cross-sectional diameter of the annulus of the "O" ring to be grasped by said jaws, each of said tongs having a hole therein,
    (b) a pair of parallel facing plates to grasp and hold therebetween the upper ends of said tongs, each of said plates having three or more aligned holes therein,
    (c) a plurality of three or more bolts or like fastening means passing through said facing plates, two of said bolts also passing though the tongs and forming pivot points about which said tongs rotate,
    (d) means mounted on said bolts to hold the facing plates in fixed parallel relationship,
    (e) means for rotating said tongs about their pivot points so that their grasping jaws move toward or away from each other to define circles having varying radii, and
    (f) a support member to hold said parallel facing plates and tongs in a fixed vertical plane and to support the tool on a flange.

2. A tool of claim 1 in which the support member includes:
    (i) a vertical plate having three or more holes aligned with like holes in the facing plates to receive the bolts passing through the parallel facing plates,
    (ii) a horizontal plate perpendicularly aligned to and integrally attached to said vertical plate,
    (iii) a lip plate depending perpendicularly from and integrally attached to said horizontal plate,
    (iv) a plurality of threaded holes in said lip plate to receive set bolts, and
    (v) a plurality of set bolts passing through the threaded holes in said lip plate and being of sufficient length to contact a face of the flange on which the tool will be secured, said tool also including means mounted on each of the bolts passing through the vertical plate of said support member to hold said vertical plate in a fixed, spaced, parallel relationship with said parallel facing plates.

3. A tool of claim 2 in which the means mounted on the bolts to hold the facing plates in fixed parallel relationship and the means mounted on the bolts to hold the vertical plate of the support member in a fixed, spaced, parallel relationship with the parallel facing plates are lock nuts.

4. A tool of claim 1 in which the means for rotating the tongs about their pivot point consists essentially of a tensioning I-bolt passing through a sleeve on the top of one tong and which enters into and engages a receiving pocket provided in a sleeve on the top of the other tong.

5. A method for sealing two complementary flanged fittings to provide a leakproof seal therebetween without requiring a worker to place a hand between the two fittings to be joined which comprises:
    (a) adjusting the grasping jaws of the tongs of a tool of claim 1 so that the circumference of the circle defined by said jaws is substantially equal to the circumference of the "O" ring seating grooves provided in the said fittings, (b) inserting into the grasping jaws of the tongs an "O" ring whose annulus has a cross-sectional diameter greater than the thickness of said jaws,
(c) adjusting the position of said tool, if necessary, so that the "O" ring is seated in the seating groove provided in one of said fittings,
(d) attaching said tool onto the flange of said fitting,
(e) moving the second flanged fitting into loose, non-touching engagement with the first flanged fitting, the distance between said flange faces being less than the cross-sectional diameter of the annulus of the "O" ring,
(f) releasing the "O" ring from the tongs by spreading their grasping jaws apart,
(g) detaching the tool from the first flanged fitting and withdrawing the tongs from between the adjoining fittings, and
(h) urging said fittings into tight engagement to compress said "O" ring and provide a leakproof seal between said fittings.

* * * * *